US008667678B2

(12) United States Patent

Floter et al.

(10) Patent No.: US 8,667,678 B2

(45) Date of Patent: Mar. 11, 2014

(54) ASSEMBLY APPARATUS FOR ASSEMBLING AND DISMANTLING A TURBOMACHINE ROTOR COMPOSED OF ROTOR DISKS

(75) Inventors: Johann Floter, Kerken (DE); Armin Hülfenhaus, Langenfeld (DE); Claus Vögelin, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 1178 days.

(21) Appl. No.: 12/595,556

(22) PCT Filed: Apr. 3, 2008

(86) PCT No.: PCT/EP2008/053993

§ 371 (c)(1), (2), (4) Date: Oct. 12, 2009

(87) PCT Pub. No.: WO2008/125507

PCT Pub. Date: Oct. 23, 2008

(65) Prior Publication Data

US 2010/0107385 A1 May 6, 2010

(30) Foreign Application Priority Data

Apr. 16, 2007 (EP) .................................... 07007681

(51) Int. Cl.

*B21K 25/00* (2006.01)

*B23P 15/04* (2006.01)

(52) U.S. Cl.

USPC ................. 29/889.2; 29/428; 29/429; 29/889

(58) Field of Classification Search

USPC .................... 29/429, 428, 430, 889–889.722; 356/622

See application file for complete search history.

(56) References Cited

FOREIGN PATENT DOCUMENTS

| | | | | |
|---|---|---|---|---|
| DE | 2026254 | * | 1/1971 | ............ B23K 37/04 |
| DE | 2325642 | A1 | 12/1973 | |
| DE | 2426231 | A1 | 12/1975 | |
| JP | 50072734 | A | 6/1975 | |
| JP | 60044267 | A | 3/1985 | |
| WO | WO 0017492 | A1 | 3/2000 | |

* cited by examiner

*Primary Examiner* — Richard Chang

(57) ABSTRACT

An assembly device for assembling and disassembling a rotor of a turbomachine with rotor disks that are clamped together by at least one tie rod is provided. The assembly device includes a turning block that is secured to a base and a securing device that secures the rotor against tilting. The rotor is arranged in a transversal manner in relation to a horizontal plane of the base and pivotably mounted on the turning block. The securing device is fixed to the base by several supports and the turning block is arranged inside the surface of the base that is clamped by the supports. Large forces and torque coming from the rotor that is arranged in a perpendicular manner are guided from the securing device to the base.

20 Claims, 4 Drawing Sheets

ASSEMBLY APPARATUS FOR ASSEMBLING AND DISMANTLING A TURBOMACHINE ROTOR COMPOSED OF ROTOR DISKS

CROSS REFERENCE TO RELATED APPLICATIONS

This application is the US National Stage of International Application No. PCT/EP2008/053993 filed Apr. 3, 2008, and claims the benefit thereof. The International Application claims the benefits of European Patent Application No. 07007681.5 EP filed Apr. 16, 2007; both of the applications are incorporated by reference herein in their entirety.

FIELD OF INVENTION

The invention relates to an assembly apparatus for assembling and dismantling a turbomachine rotor composed of rotor disks, which rotor disks are braced with respect to one another by means of at least one tie rod, said assembly apparatus comprising a turning block fastened on a foundation, and a securing device which secures a rotor mounted pivotably on the turning block and set up transversely with respect to a horizontal plane of the foundation, against tipping over.

BACKGROUND OF INVENTION

Gas turbines and their construction are generally known. The rotors of gas turbines may in this case be constructed and assembled in various ways. One rotor variant comprises a multiplicity of elements which lie one against the other and which are braced via a tie rod extending centrally through the elements. These elements are, on the one hand, rotor disks and, on the other hand, tubular sections, what are known as hollow shafts, which may bear against the rotor disks. The rotor disks and hollow shafts are in each case braced by means of screw nuts screwed onto the end faces of the tie rod, the screw nut provided on the compressor side often being designed as a hollow shaft. As a rule, the rotor disks bearing one against the other over a large area on their end faces carry the moving blades of the turbine and of the compressor on their outer circumferences. Instead of one central tie rod, it is also known to use a plurality of decentral eccentric tie rods.

In order to assemble and dismantle a multipart rotor of this type, an assembly tool is known which comprises essentially two bearing blocks. The two bearing blocks are set up at a distance from one another and the rotor is deposited on them. One of the two bearing blocks, what is known as the turning block, is in this case equipped with a joint which is arranged between the foot and the bearing surface and it is fastened to one end of the rotor. The rotor is therefore placed such that its, for example, compressor-side end can be fastened directly to the joint of the turning block. The other bearing block then supports the rotor on the turbine side. The joint fastened to the turning block serves for transferring the rotor out of the horizontal position into a position perpendicular thereto. For this purpose, a suspension nut is screwed onto the tie rod at the turbine-side end of the rotor. A cable of a crane is fastened to the suspension nut by means of a shackle. While the crane is lifting the turbine-side end of the rotor, the compressor-side end rotates about the center of rotation of the joint. The lifting operation is concluded when the rotor has reached an approximately vertical position. It is then secured against tipping over by means of a securing device which is also provided on the turning block. As a rule, this securing device comprises a blocking bolt which is provided, above the joint, on the turning block and which blocks the backward movement of the rotor out of the vertical position. The suspension nut is subsequently demounted, after which the actual work on the vertically set-up rotor (or tie rod) can then be carried out.

To assemble the rotor, first the tie rod is set up vertically, and subsequently the individual rotor disks are slipped onto the tie rod in succession from above by means of a crane. A turbine-side rotor nut is then screwed on. When a fully mounted rotor is being demounted, after it has been set up vertically, the rotor nut arranged on the turbine side is removed, after which the individual rotor disks can be extracted from the tie rod. The rotor then comprises essentially only the tie rod.

A similar setting-up apparatus with a turning block is known from Gelman Laid-open publication 24 26 231. A first stop is fastened centrally, under the turning block, to the foundation. In contrast to the abovementioned apparatus, it is not the end of the rotor which is fastened to the turning block, but, instead, a rotor point at a distance from the end. When the longer rotor section is being lifted, the shorter rotor section then pivots toward the foundation. The coupling flange arranged on the shorter rotor section bears against the first stop after vertical set-up, after which a second stop is then adapted on the other side of the flange and is fixedly connected via screws to the first stop in order to secure the rotor against tipping over.

SUMMARY OF INVENTION

An object of the present invention is to specify a novel assembly apparatus for assembling and dismantling a turbomachine rotor composed of rotor disks, by means of which assembly apparatus an earthquake-proof support of the vertically set up rotor is achieved.

The object is achieved by an assembly apparatus as claimed in the claims.

The invention proceeds from the recognition that an earthquake-proof assembly apparatus can be obtained when the turning block and the securing device for preventing tipping over can be fastened separately from one another to the foundation. Hitherto, the securing device has been provided either on the turning block or comparatively near to the pivoting point. On account of this arrangement, only a comparatively weak securing of the vertically standing rotor was possible, which, in zones where minor earthquakes occur comparatively often, for example in California or in New Zealand, could no longer ensure a reliable support of the rotor set up vertically for assembly or disassembly. In light of this requirement, according to the invention, there is provision for using stays which carry the securing device and are fastened to the foundation and which span a foundation surface in which the turning block is arranged. The securing device is, as it were, jacked up via a scaffold formed from stays. The turning block according to the invention then absorbs only the weight forces of the vertically set-up rotor and conducts these further on into the foundation. A torque load upon the turning block fastening, as in the prior art, is thus avoided. Said turning block can consequently have a comparatively simple design. The forces acting from the rotor laterally upon the securing device can be conducted into the foundation, away from the turning block, via the stays fastened in the vicinity of the turning block.

Further, the distance between the rotor support point projected on the foundation and the likewise projected points of the lateral rotor support preventing the rotor from tipping over about the axis of rotation of the joint is increased significantly due to the use of preferably four stays. In other words, the distance, determined over the vertical height of the foundation, between the central fastening point of the rotor to the turning block and the point of its lateral support is increased significantly, with the result that the lateral supporting forces to be absorbed by the securing device and to be diverted by the stays can be kept comparatively low.

Moreover, owing to the design of the centrally arranged turning block and of the stays surrounding this in a punctiform manner on the foundation, an assembly apparatus of lightweight build can be made possible.

Owing to the separation of the support of the rotor in the turning block and the securing of the rotor against tipping over by means of the securing device, pronounced laterally acting forces and moments emanating from the rotor and occuring, for example, during a comparatively weak earthquake can now be absorbed by the securing device and diverted into the foundation, without the vertically set-up rotor in this case threatening to tip over or actually tipping over. The forces for lateral support are in this case absorbed at a height, with respect to the foundation plane, which is substantially greater than the height of the axis of rotation of the joint of the turning block to which the rotor is fastened.

Thus, by virtue of the invention, an especially safe and reliable assembly apparatus for assembling and dismantling a turbomachine rotor composed of rotor disks can be specified.

The securing device in this case comprises a supporting surface against which the rotor bears. The supporting surface is preferably slightly displaceable. Particularly when the rotor is to be oriented into the vertical position, the forces acting from the rotor on the securing device transversely to the normal force are comparatively low, so that the securing device can have correspondingly adapted dimensioning. Furthermore, the vertically standing rotor makes it possible to slip rotor disks onto or off the tie rod in a particularly simple way. Insofar as the supporting surface against which the rotor comes to bear can be displaced in a plane approximately parallel to the horizontal plane, the already approximately vertically standing rotor can be oriented such that only balancing forces have to be absorbed by the securing device and its scaffold. The entire weight force of the rotor is in this case then carried by the turning block and conducted into the foundation.

Advantageous refinements are specified in the dependent claims.

In an expedient refinement, the securing device is arranged above the foundation via four stays arranged in a rectangle on the foundation.

The securing device has to absorb only comparatively low forces if it comprises at least one supporting surface by means of which the rotor set up transversely with respect to the horizontal plane can be supported laterally, and in which the vertical distance between a joint of the turning block and the supporting surface arranged above it is 2 m to 3 m.

In an advantageous refinement of the securing device, this has above the foundation a platform or work stage jacked up on a plurality of stays and struts. The platform serves, for example, as a work platform for fitters who carry out the orientation of the rotor into the vertical position. Then especially, it is advantageous if the supporting surface is provided at the height of the platform, for example in the bottom of the latter. The one or more supporting surfaces which are provided on horizontally displaceable elements can then be connected to the platform via the screw connections or the hydraulic cylinders.

According to a further advantageous refinement, the turning block is designed in such a way that it conducts the weight force of the rotor further on into the foundation over a circular area. A punctiform, possibly inadmissibly high weight load upon the foundation can thereby largely be avoided. Instead, the weight load of the rotor is distributed by the turning block to the circular connecting surface of the turning block and foundation.

BRIEF DESCRIPTION OF THE DRAWINGS

The invention is explained by means of a drawing in which, diagrammatically and not true to scale.

Identical components are given the same reference symbols in the figures.

DETAILED DESCRIPTION OF INVENTION

Figure 1:
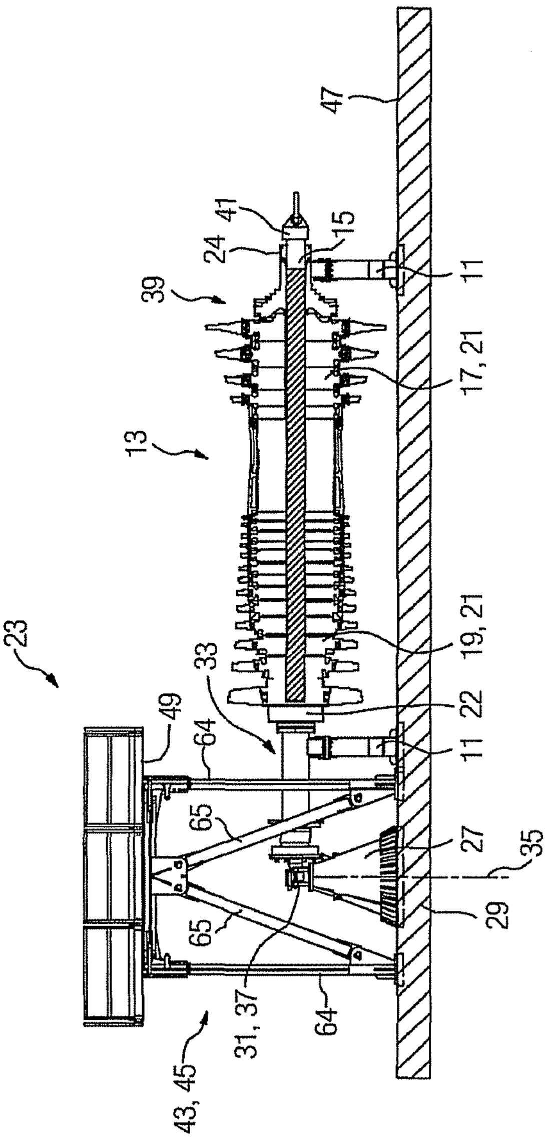
FIG. 1 shows the assembly apparatus for assembling and dismantling a rotor, with the rotor arranged (horizontally) parallel to the horizontal plane.

FIG. 1 illustrates a rotor 13 deposited on two bearing blocks 11, of a heavy stationary gas turbine. The rotor 13 comprises a tie rod 15 which extends centrally through a multiplicity of turbine disks 17 and compressor disks 19. In the example illustrated, the compressor-side end of the rotor 13 is illustrated on the left. The turbine disks 17 and the compressor disks 19 are rotor disks 21 and carry at their outer ends moving blades which can be exposed to a compressible flow medium of the gas turbine.

For bracing the rotor disks 21, a front hollow shaft 22 is screwed onto the tie rod 15 on the compressor-side end 33 of the rotor 13. A screw nut 24 is provided on the turbine side.

In order to dismantle the modular rotor 13 of the gas turbine into its individual parts, in addition to the two bearing blocks 11 an assembly apparatus 23 is provided which is arranged at the rotor end. The assembly apparatus 23 comprises a turning block 27 which is fastened on a foundation 29. The turning block 27 is set up in alignment with the two bearing blocks 11 and in this case has at its tip a joint 31 which is connected to the compressor-side end 33 of the rotor 13. The rotor 13 is in this case rotatable about an axis of rotation, parallel to the horizontal plane 47, of the joint 31. Further more, the joint 31 comprises a rolling-bearing-mounted receptacle for a turntable 37 rotatable about a vertical axis 35. Moreover, the rotary support point lies on the vertical axis 35.

Mounted at the turbine-side end 39 of the rotor 13 is a suspension nut 41, to which the cable of a crane can be fastened by means of a shackle.

The assembly apparatus 23 comprises, furthermore, a securing device 45 which is designed as a scaffold 43 and which is anchored separately from the turning block 27 in the foundation 29.

The scaffold 43 comprises a platform 49 or work stage jacked up on four vertical stays 64. For stiffening the scaffold 43, further struts 65 extending transversely with respect to the stays 64 are provided at each side edge of the scaffold 43 and additionally connect the foundation-side ends of the stays 64 to the platform 49.

So that the rotor 13 can be pivoted into the scaffold 43 and into the securing device 45, part of the platform 49 and the struts 65 arranged below it can be moved out of the pivoting range of the rotor 13. The platform 49 and the securing device 45 then have an opened receptacle (cf. FIG. 3).

By the turbine-side end 39 of the rotor 13 being raised by means of the crane, the rotor 13 is lifted out of the two bearing blocks 11, the compressor-side end of the rotor 13 rotating about the axis of rotation of the joint 31. With the receptacle open, the rotor 13 can then be turned out of its horizontal position (FIG. 1) into the vertical position (FIG. 2), after which it is secured against tipping over by means of the securing device 45. The receptacle is closed for this purpose. The rotor 13 is then in the position illustrated in FIG. 2.

The entire weight force of the rotor 13, which is comparatively heavy when it is used in stationary gas turbines, then exerts a load upon the turning block 27, whereas the scaffold 43 can prevent the rotor 13 from tipping over by means of comparatively low forces. The least force is required when the rotor 13 is oriented vertically and the axis of symmetry 46 of the rotor 13 coincides with the axis 35 of the turntable 37.

On account of the comparatively long distance between the joint 31 and the lateral support of the rotor 13 at the height of the platform 49, an especially reliable and, moreover, also earthquake-proof lateral support of the rotor 13 can be afforded. Earthquake-proof means in this context that the acceleration forces upon the rotor 13, of the order of magnitude of approximately ½ g (1 g=simple gravitational acceleration), which occur with comparatively low intensity during comparatively weak earthquakes can be absorbed by the securing device 45 and be diverted into the foundation 29 via the platform 49 and the struts 65.

Figure 2:
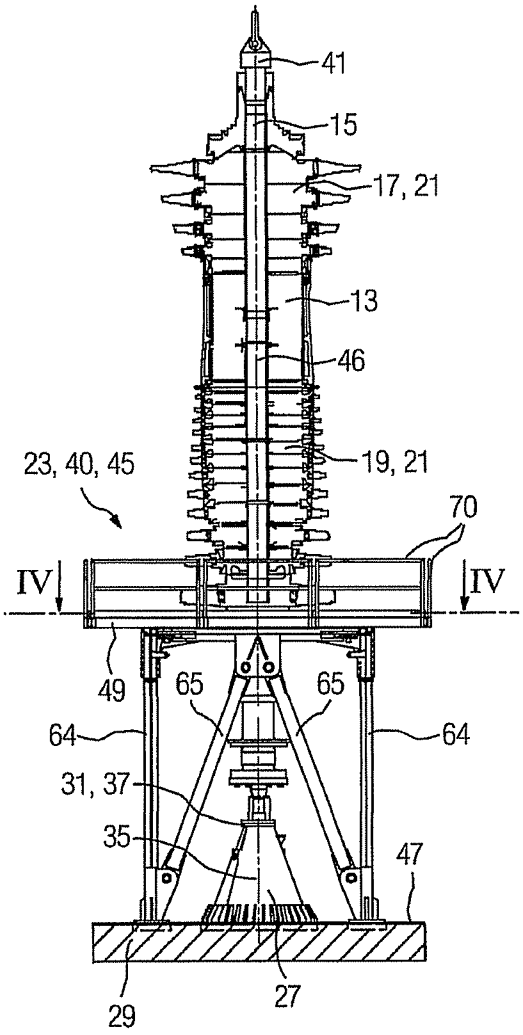
FIG. 2 shows the assembly apparatus according to FIG. 1, with the rotor set up vertically.
Figure 3:
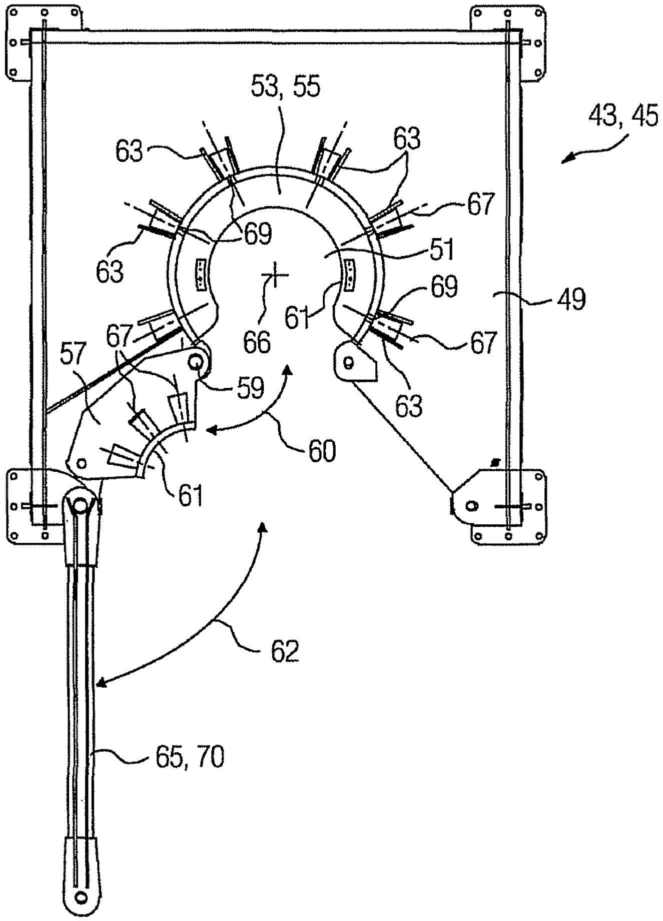
FIG. 3 shows a top view of the securing device, with the receptacle open.
Figure 4:
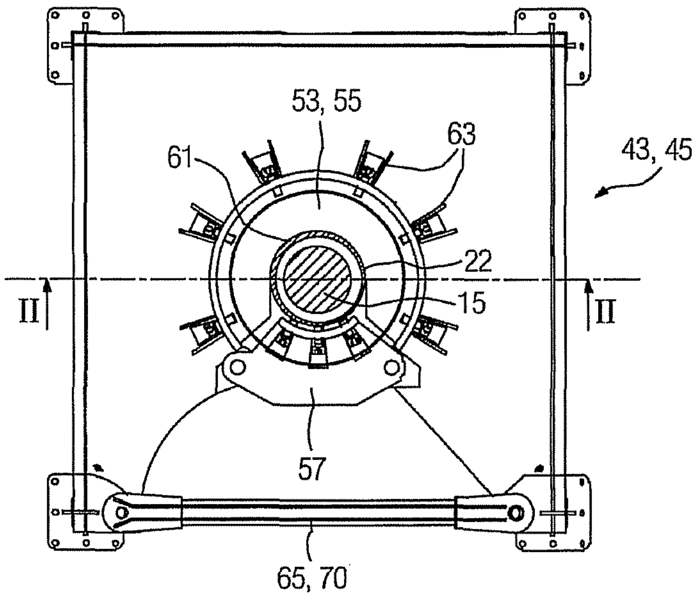
FIG. 4 shows a top view of the securing device, with the rotor introduced.

FIGS. 3 and 4 show a top view of the platform 49 of the securing device 45, FIG. 3 showing the platform 49 opened in order to receive the rotor 13, and FIG. 4 showing the closed platform 49 with the centrally arranged tie rod 15 and front hollow shaft 22 according to the sectional view IV-IV of FIG. 2. In the platform 49 of the securing device 45, a centrally arranged orifice 51 is provided, in which an axial section of the hollow shaft 22 can be introduced. The orifice 51 is surrounded by a segmented ring 53, the first segment 55 of which comprises a segment arc of approximately 270° and the second segment 57 of which comprises a segment arc of approximately 90°. The second ring segment 57 is pivotable with respect to the first ring segment 55 about an axis of rotation 59, thus serving for the simple and rapid closing and opening of the ring 53 (cf. FIG. 4). The two segments 55, 57 in each case have an inwardly directed supporting surface 61 which in each case can be brought to bear against a portion of the surface area of the rotor 13 or of the tie rod 15.

The ring 53 lies in a plane parallel to the horizontal plane 47, that is to say parallel to the foundation 29, and can be displaced, by means of an auxiliary device carrying it, within this plane for the vertical orientation of the rotor 13.

The auxiliary device comprises, for example, a plurality of screw connections 63 fastened to the platform 49. Each of these screw connections 63 has a screw axis 67 which likewise lies in the plane parallel to the horizontal plane 47. The screw connections 63 are arranged in a radiating manner when the ring 53 is closed, so that their screw axes 67 meet at a virtual center 66. Instead of the screw connections 63, a hydraulic arrangement with a movable piston rod may also be provided in each case, in order, in turn, to support the ring 53 laterally and at the same time to orient the rotor 13 (or else the tie rod 15) with respect to the turning block 27 in such a way that the rotor 13 can be displaced from an approximately horizontal orientation to a vertical orientation.

Instead of the screw connection or instead of hydraulic cylinders, the ring 53 may also be mounted in a double-nested eccentric, so that the orifice 51 can be oriented, as desired, with respect to the axis 35 of the turning block 27.

The ring 53, too, is, overall, merely optional. It is also possible, for example, for the lateral support of the rotor 13 to take place directly by means of the screw connections 63 or directly by means of the piston rods of the hydraulic cylinders. The supporting surfaces 61 would then be arranged at the inwardly projecting free ends 69 of the screw connections 63 or at the inwardly projecting free ends of the piston rods of the hydraulic cylinders, which ends would then be capable of being brought to bear directly against the surface area of the rotor 13.

So that the rotor 13 can be pivoted into the orifice 51 when its turbine-side 39 is being raised, the ring 53 and the platform 49 must be opened beforehand. For this purpose, there is provision for the second segment 57 of the ring 53 to be pivotable about the axis of rotation 59 according to the arrow 60, from a closed position into an open position (illustrated). In the same way, the struts 65, illustrated at the bottom in FIG. 3, and the railing 70 of the work stage are swung away from the platform 49 according to the arrow 62, so that, overall, the receptacle is opened.

FIG. 4 shows a top view of the securing device 45, with the ring 53 closed virtually completely. The ring 53 surrounds the hollow shaft 22, so that the supporting surfaces 61 bear against the surface area of the hollow shaft 22. The ring 53 is displaceable in the plane parallel to the foundation 29 via the individual screw connections 63, so that the center of the ring 53 and therefore the center of the tie rod 15 can be displaced slightly with respect to the turning block 27 and therefore with respect to the central rotor support point, in order to bring the rotor 13 into a vertical orientation.

Overall, owing to the structural separation of the turning block and securing device, the latter can absorb higher forces and moments emanating from the rotor and conduct them further into the foundation than a securing device which is attached directly to the turning block. Pronounced forces may occur, for example, during comparatively minor earthquakes, and therefore the apparatus according to the invention to a certain extent fulfils earthquake requirements. Moreover, the scaffold may also serve as a work platform, so that the orientation of the rotor into a vertical position can be carried out substantially more simply by fitters.

The invention claimed is:

1. An assembly apparatus for assembling and dismantling a rotor composed of rotor disks, the rotor disks being braced to one another by a tie rod, comprising:

a turning block fastened on a foundation;

a securing device for securing a rotor against tipping over, the rotor being mounted pivotably on the turning block and set up transversely with respect to a horizontal plane of the foundation, the securing device being fastened to the foundation separately from the turning block, wherein the securing device is fastened to the foundation by a plurality of stays, and wherein the turning block is arranged within the foundation surface and the plurality of stays.

2. The assembly apparatus as claimed in claim 1, wherein the securing device is arranged above the foundation via the plurality of stays arranged in a rectangle on the foundation.

3. The assembly apparatus as claimed in claim 2, wherein the plurality of stays carry a platform.

4. The assembly apparatus as claimed in claim 3, wherein the supporting surface is provided at a height of the platform.

5. The assembly apparatus as claimed in claim 3, wherein the platform is designed as a work stage for technical personnel.

6. The assembly apparatus as claimed in claim 2, wherein the turning block conducts a weight force of the rotor further on into the foundation over a circular area.

7. The assembly apparatus as claimed in claim 1, wherein the securing device comprises a supporting surface, wherein the rotor set up transversely with respect to the horizontal plane is supported laterally by the supporting surface, and wherein a vertical distance between a joint of the turning block and the supporting surface arranged above is between 2 m and 3 m.

8. The assembly apparatus as claimed in claim 2, wherein the securing device comprises a supporting surface, wherein the rotor set up transversely with respect to the horizontal plane is supported laterally by the supporting surface, and wherein a vertical distance between a joint of the turning block and the supporting surface arranged above is between 2 m and 3 m.

9. The assembly apparatus as claimed in claim 8, wherein the plurality of stays carry a platform.

10. The assembly apparatus as claimed in claim 9, wherein the supporting surface is provided at a height of the platform.

11. The assembly apparatus as claimed in claim 10, wherein the platform is designed as a work stage for technical personnel.

12. The assembly apparatus as claimed in claim 7, wherein the plurality of stays carry a platform.

13. The assembly apparatus as claimed in claim 12, wherein the supporting surface is provided at a height of the platform.

14. The assembly apparatus as claimed in claim 7, wherein the turning block conducts a weight force of the rotor further on into the foundation over a circular area.

15. The assembly apparatus as claimed in claim 1, wherein the plurality of stays carry a platform.

16. The assembly apparatus as claimed in claim 15, wherein the supporting surface is provided at a height of the platform.

17. The assembly apparatus as claimed in claim 16, wherein the platform is designed as a work stage for technical personnel.

18. The assembly apparatus as claimed in claim 15, wherein the platform is designed as a work stage for technical personnel.

19. The assembly apparatus as claimed in claim 15, wherein the turning block conducts a weight force of the rotor further on into the foundation over a circular area.

20. The assembly apparatus as claimed in claim 1, wherein the turning block conducts a weight force of the rotor further on into the foundation over a circular area.

* * * * *